United States Patent
Dhar et al.

(10) Patent No.: US 7,443,792 B2
(45) Date of Patent: Oct. 28, 2008

(54) METHOD AND SYSTEM FOR SELECTING CONNECTIONS TO BUMP BASED ON PRIORITY IN A NETWORK

(75) Inventors: Sandeep Dhar, Bangalore (IN); Ashwin Raj Madhwaraj, San Jose, CA (US); Puneet Gupta, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 10/928,253

(22) Filed: Aug. 27, 2004

(65) Prior Publication Data

US 2006/0045095 A1    Mar. 2, 2006

(51) Int. Cl.
  *H04L 12/56* (2006.01)
(52) U.S. Cl. .............. 370/230; 370/395.21; 370/395.43
(58) Field of Classification Search ............. 370/395.42
  See application file for complete search history.

(56) References Cited

U.S. PATENT DOCUMENTS

| | | | | |
|---|---|---|---|---|
| 5,594,717 A | * | 1/1997 | Watanabe et al. | 370/232 |
| 6,028,840 A | * | 2/2000 | Worster | 370/230 |
| 6,128,280 A | * | 10/2000 | Jamoussi et al. | 370/230 |
| 6,141,322 A | * | 10/2000 | Poretsky | 370/231 |
| 6,160,818 A | * | 12/2000 | Berger et al. | 370/468 |
| 6,563,788 B1 | | 5/2003 | Torba et al. | 370/229 |
| 6,801,520 B2 | | 10/2004 | Philonenko | 370/351 |
| 2004/0213153 A1 | * | 10/2004 | Nagato et al. | 370/230 |
| 2005/0160171 A1 | * | 7/2005 | Rabie et al. | 709/227 |

* cited by examiner

*Primary Examiner*—Wing F. Chan
*Assistant Examiner*—Brian Roberts
(74) *Attorney, Agent, or Firm*—Stolowitz Ford Cowger LLP

(57) ABSTRACT

A method and system for selecting connections to bump based on priority in a network. The present invention describes a method for selecting connections to bump in a network to accommodate an incoming connection. The method begins by receiving an incoming connection that is associated with a priority level and a bandwidth group. A plurality of existing connections is indexed by priority level and bandwidth group. A required bandwidth is calculated that is necessary to support the incoming connection. Then, a single existing connection is selected to be released from the plurality of existing connections that is associated with a lower priority and a higher bandwidth group than the incoming connection. If a single connection cannot be selected, then at least one existing connection is selected to be released having a lower priority level and at least the same bandwidth group than that of the incoming connection.

33 Claims, 7 Drawing Sheets

METHOD AND SYSTEM FOR SELECTING CONNECTIONS TO BUMP BASED ON PRIORITY IN A NETWORK

BACKGROUND OF THE INVENTION

1. Field of the Invention

Embodiments of the present invention relate to the field of network connection management. More particularly, embodiments of the present invention relate generally to selecting connections to bump in a network.

2. Related Art

Asynchronous Transfer Mode (ATM) technology is used as a backbone technology for some modern carrier networks. ATM supports network transmission of information including data as well as real-time voice and video. Connections over which information is transmitted within an ATM network can be associated with priority levels. Higher priority connections are serviced before lower priority connections.

In an ATM network, priority bumping requires that lower priority connections need to be bumped or released to free up necessary resources to accommodate an incoming higher priority connection. This occurs when available resources are insufficient to satisfy the requirements of an incoming connection that has a higher priority.

In a typical ATM network, each link (e.g., from a switch) can have thousands of connections transmitting information through that link. Selecting which connections to release to accommodate the incoming connection can be difficult given the high number of connections serviced by the link. Conventional attempts to select connections to be released followed a brute approach that was time consuming and resource intensive. For instance, one prior art approach looped through all the connections on the link to analyze all the possible combinations for releasing connections. Another prior art approach would select any set of connections without any further criteria to free up the required bandwidth.

However, as a disadvantage, these conventional methods for selecting connections to be released to accommodate an incoming higher priority call cannot ensure that the least possible number of connections will be bumped. In addition, these conventional methods inefficiently used resources to employ the brute force techniques that looped through all the connections to select released connections. Also, these conventional brute force methods are not scalable to larger numbers of connections as more and more CPU resources are needed to loop through all the connections.

SUMMARY OF THE INVENTION

Accordingly, various embodiments of the present invention disclose a method and system for selecting connections to bump based on priority in a network. Embodiments of the present invention provide for selecting the least number of connections to be released to accommodate an incoming connection. In addition, embodiments of the present invention provide for efficient use of computing resources in order to determine the connections to be released to free up bandwidth. Also, embodiments of the present invention are scalable to large numbers of connections.

Embodiments of the present invention describe a method and system for selecting connections to bump based on priority in a network. The present invention describes a method for selecting connections to bump in a network to accommodate an incoming connection. The method begins by receiving an incoming connection that is associated with a priority level from a plurality of priority levels and a bandwidth group from a plurality of bandwidth groups. A plurality of existing connections is indexed by priority level and bandwidth group. A required bandwidth is calculated that is necessary to support the incoming connection. Then, a single existing connection is selected to be released from the plurality of existing connections that is associated with a lower priority and a higher bandwidth group than the incoming connection. If such a single connection is not present, then at least one existing connection is selected to be released having a lower priority level and at least the same or lower level bandwidth group than that of the incoming connection.

The method begins by receiving an incoming connection that is associated with a priority level and a bandwidth group. A plurality of existing connections is indexed by priority level and bandwidth group. Then, the method selects at least one existing connection to be released from the plurality of existing connections in order to accommodate the incoming connection. The connections selected are based on a highest appropriate bandwidth group criteria in order to ensure that the least number of connections are selected for release.

DETAILED DESCRIPTION OF THE INVENTION

Figure 1:
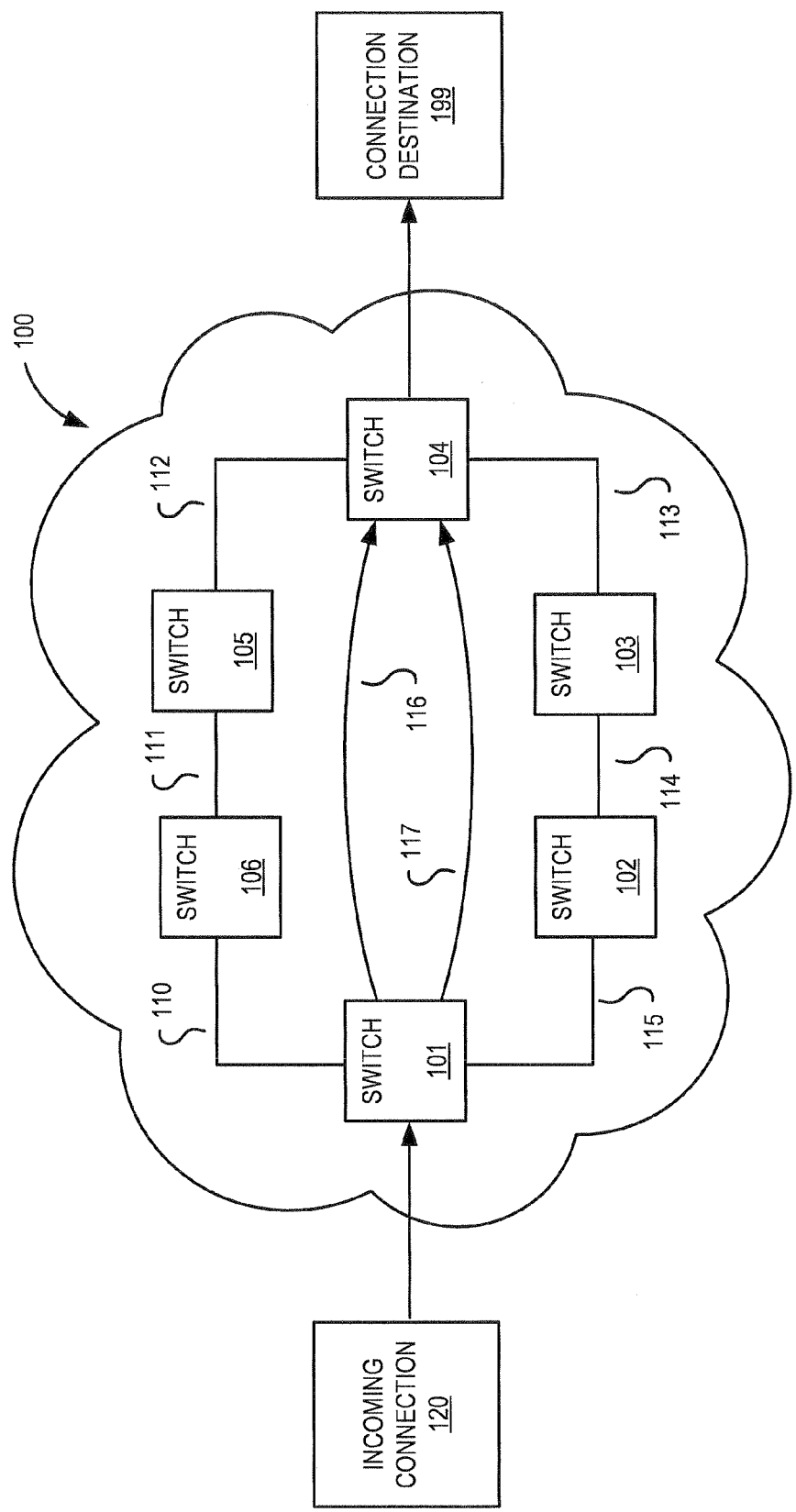
FIG. 1 is an exemplary ATM network, upon which an embodiment of the present invention can be deployed, in accordance with one embodiment of the present invention.

Reference will now be made in detail to the preferred embodiments of the present invention, a method and system of selecting connections to bump based on priority in a network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention are implemented on software running on a computer system. For instance, the computer system is a personal computer, notebook computer, server computer, mainframe, a network device such as a switch, network control computer, networked computer, and the like. This software program is operable for selecting connections to bump based on priority in a network. In one embodiment, the computer system includes a processor coupled to a bus and memory storage coupled to the bus. The memory storage can be volatile or non-volatile and can include removable storage media. The computer can also include a monitor, provision for data input and output, etc.

Some portions of the detailed description which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "selecting," "sorting," "resorting," and "calculating," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, various embodiments of the present invention disclose a method and system for selecting connections to be released, or bumped, based on priority in a network to accommodate an incoming connection. Embodiments of the present invention are superior to conventional techniques as they provide for selecting the least number of connections to be released to accommodate an incoming connection. In addition, embodiments of the present invention provide for efficient use of computing resources in order to determine the connections to be released to free up bandwidth. Also, embodiments of the present invention are scalable to large numbers of connections.

FIG. 1 depicts an exemplary Asynchronous Transfer Mode (ATM) network 100, in accordance with one embodiment of the present invention. ATM is a high performance, cell oriented switching and multiplexing technology that utilizes fixed-sized cells to carry different types of traffic, such as voice, video, data, etc. ATM is a connection oriented packet switching technique in which all packets are of fixed length (e.g., 53 bytes).

The ATM network 100 includes a set of ATM switches interconnected by point-to-point ATM links or interfaces. A link from a switch can contain thousands of connections. In an ATM network, the connections are of varying bandwidth. Over these connections, information is transferred using ATM in an integrated manner. For instance, ATM network 100 includes ATM switches 101, 102, 103, 104, 105, and 106. Link 110 services switches 101 and 106. Link 111 services switches 106 and 105. Link 112 services switches 105 and 104. Link 113 services switches 104 and 103. Link 114 services switches 103 and 102. Link 115 services switches 102 and 101. Also, links 116 and 117 service switches 101 and 104.

Switches are responsible for cell transmission and switching through the ATM network 100. For instance, switch 101 receives an incoming connection 120 and switches the incoming connection 120 to an output interface (a link) toward its destination 199. For instance, switch 101 may decide that the incoming connection 120 is serviced by link 117. As such, the incoming connection will be established on link 117 by switch 101.

Embodiments of the present invention are capable of selecting connections to bump based on priority in a network. While embodiments of the present invention are disclosed within the context of an ATM network, other embodiments are well suited to selecting connections to bump based on priority in any network that has connections of varying bandwidth, a priority level system between the connections, and insufficient bandwidth to accommodate all the connections in the network.

Figure 2A:
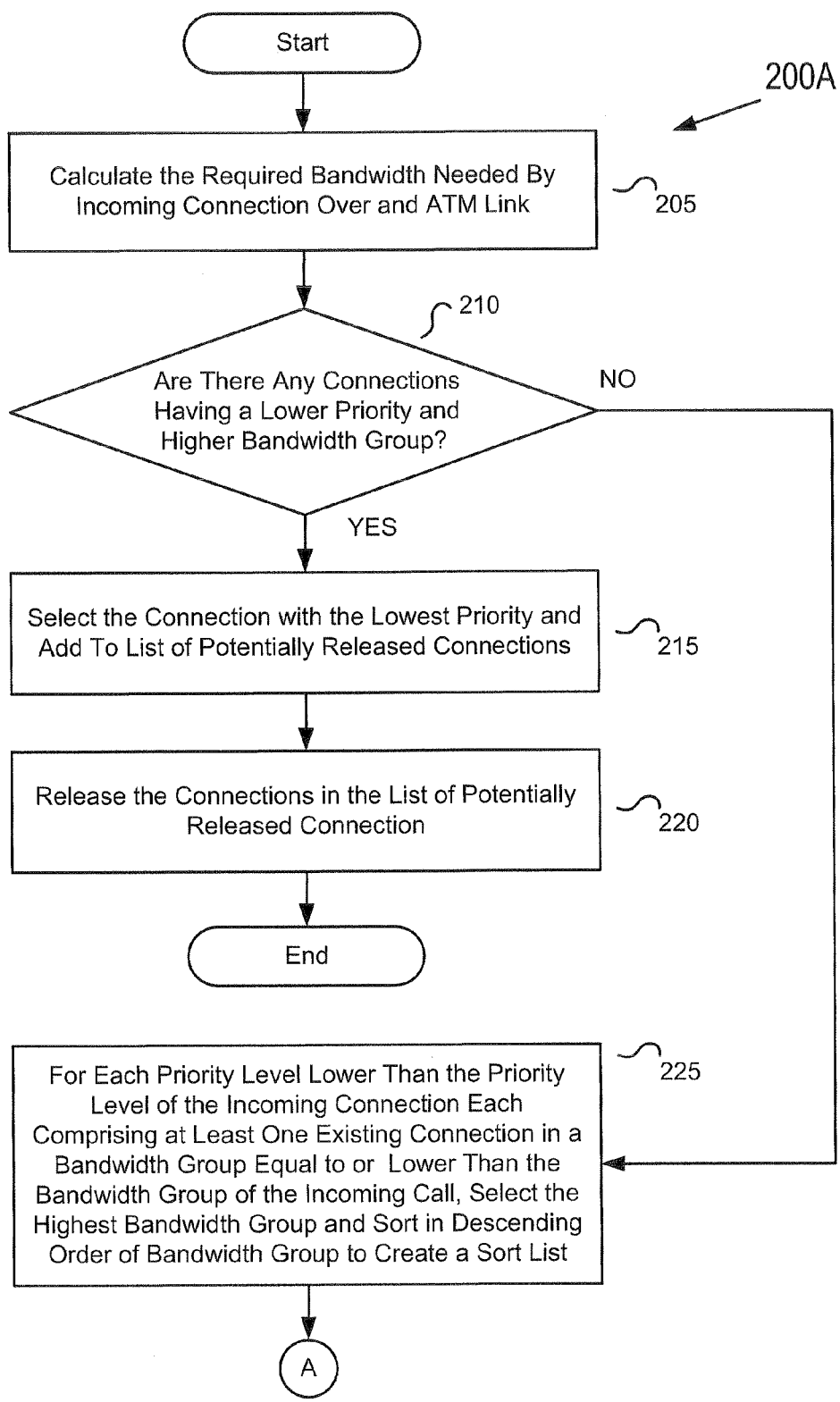
FIGS. 2A and 2B are flow diagrams illustrating a computer implemented method for selecting connections to be released in an ATM network, in accordance with one embodiment of the present invention.
Figure 2B:
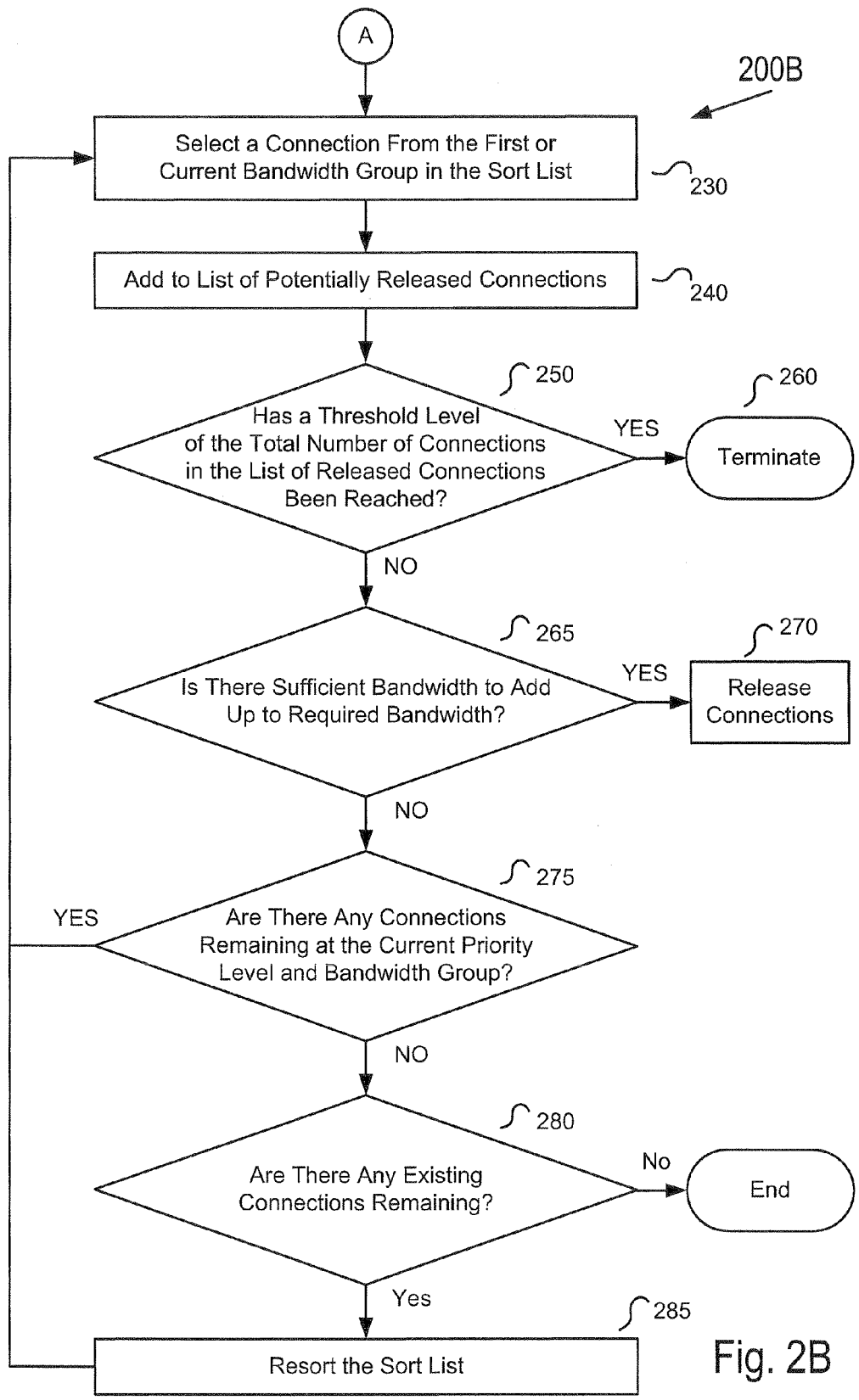

FIGS. 2A and 2B are flow diagrams 200A and 200B, respectively, illustrating steps in a computer implemented method for selecting connections to bump based on priority in a network. The flow diagrams 200A and 200B illustrate the process in selecting existing connections when a new incoming connection needs to be established over a link in a network (e.g., ATM network), and there are insufficient resources on the link to support the connection bandwidth needed to support the incoming connection.

Beginning with FIG. 2A, at 205, the present embodiment calculates the required bandwidth needed to support the incoming connection, as is described in full in Equation 1, below. Once the required bandwidth is calculated, lower priority connections to be selected can be identified to satisfy the required bandwidth.

At 210, the present embodiment determines if there are any existing connections having a lower priority level and a higher bandwidth group than the priority level and the bandwidth group of the incoming connection. If there are any connections meeting this criteria, then one of these existing connections can be released to accommodate the incoming connection, and the present embodiment proceeds to 215.

Figure 3:
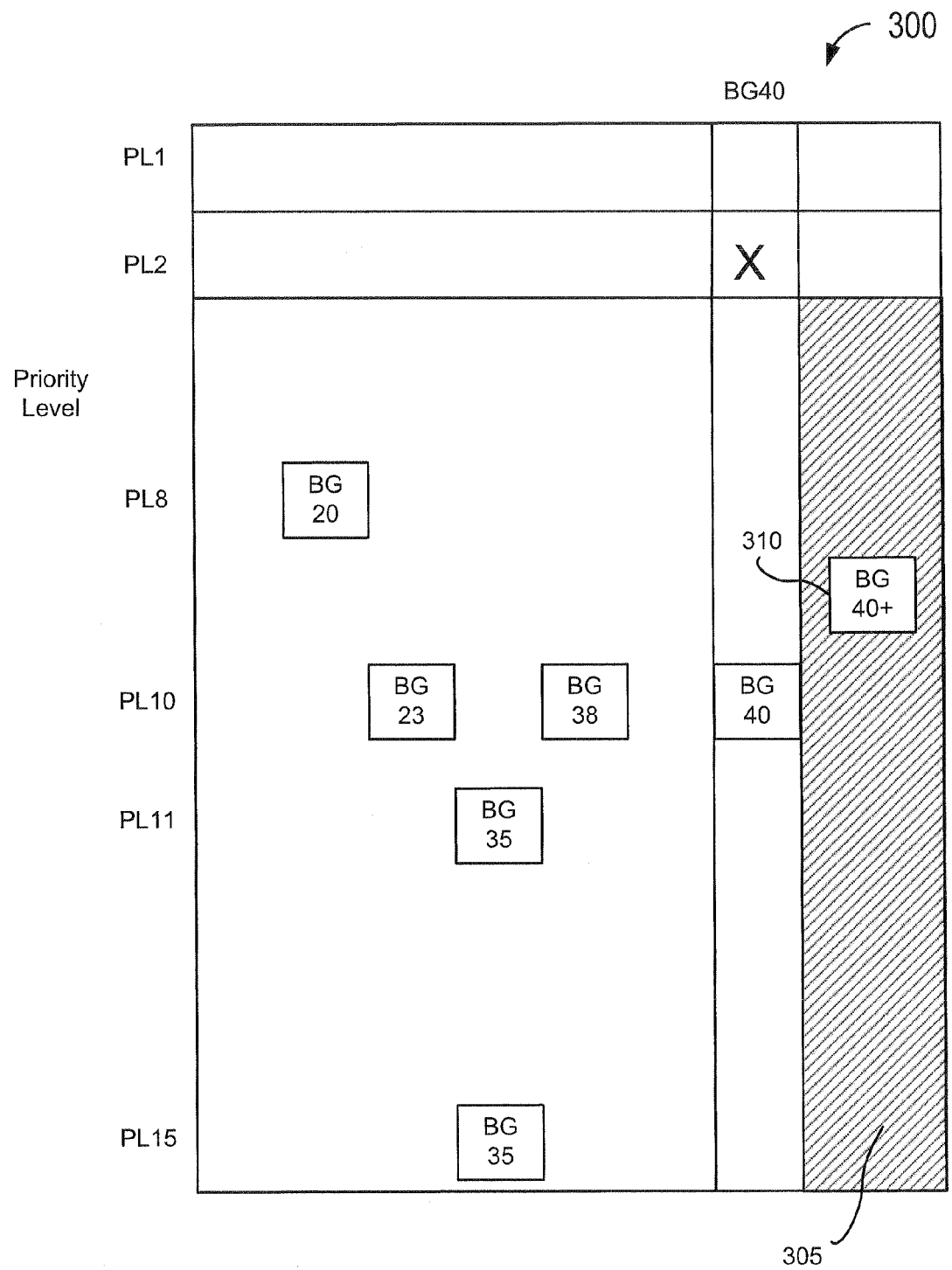
FIG. 3 is a diagram of a per-link database illustrating possible connections to be released over a link to accommodate an incoming connection, in accordance with one embodiment of the present invention.

For example, FIG. 3 provides an exemplary diagram of a per-link database 300 of a link over a network (e.g., ATM network). In FIG. 3, the incoming connection that has a priority level of 2 (PL2) and a bandwidth group of 40 (BG40) if connected will occupy the block marked with an "X" in the per-link database 300. Region 305 illustrates connections that are associated with bandwidth groups higher than the bandwidth group of the incoming connection and of lower priority levels than the priority level of the incoming connection. In the present case, at 215, the present embodiment determines that an active bandwidth group 310 has a higher bandwidth greater than 40 (BG40+) and has a priority level lower than 2. As such any connection in this bandwidth group (BG40+) can be selected to be released in order to accommodate the incoming connection.

At 215, if there are two or more active bandwidth groups that are greater than the bandwidth group of the incoming connection, and of lower priority levels than the incoming connection, the present embodiment selects a connection from a bandwidth group that has the lowest priority level. That is, among the group of active bandwidth groups greater than the incoming connection with priority levels lower than the incoming connection, a connection from the active bandwidth group with the lowest priority level in that group is selected. In addition, the connection selected is added to the list of potentially released connection.

At 220, the connections in the list of potentially released connections are released to accommodate the incoming connection. On the other hand, if there are no connections having a lower priority and a higher bandwidth group than the incoming connection, then the present embodiment proceeds to 225.

At 225, the present embodiment sorts in descending order of bandwidth group the existing connections in the active bandwidth groups to create a sort list. That is, for each priority level lower than the priority level of the incoming connection in the per-link database, the highest bandwidth group is selected and placed in the sort list. The sort list is then ordered in descending order of bandwidth group, starting with the highest numbered bandwidth group classifying the highest bandwidth supported connections, to create the sort list. Priority levels are not used as a further criteria.

FIG. 3 provides an exemplary per-link database 300 that illustrates the existing connections by active bandwidth group over a link in a network. For instance, assuming that bandwidth group 310 (B40+) does not contain any existing connections and is not active, the existing connections are contained in priority level 8 (PL8), PL10, PL11, and PL15. For example, priority level 8 (PL8) is associated with active bandwidth group BG20. Also, PL10 is associated with BG23, BG38, and BG40. PL11 is associated with BG35, and PL15 is associated with BG35.

To illustrate the formation of the sort list, Table 1 provides the active bandwidth groups in the sort list for the existing connections over the link as illustrated by FIG. 3. The columns define the bandwidth group, the priority level, and the number of connections per bandwidth group and priority level.

TABLE 1

Sort List of FIG. 3

| Bandwidth Group | Priority Level | Connections |
| --- | --- | --- |
| BW40 | PL10 | 2 |
| BW35 | PL15 | 1 |
| BW35 | PL11 | 3 |
| BW20 | PL8 | 2 |

As shown in Table 1, if the highest bandwidth group per priority level is the same for two or more priority levels, then the bandwidth groups as entered in the sort list are ordered by lowest priority level. That is, the bandwidth group with the lowest priority level is entered first and above bandwidth groups with higher priority levels in the sort list. As will be explained below, connections to be released are taken starting at the top of the sort list (e.g., starting with the highest numbered bandwidth group classifying the highest bandwidth supported connections).

Continuing with FIG. 2B, at 230, the present embodiment then selects a connection from the first bandwidth group in the sort list. That is, a connection is selected from the first bandwidth group/priority level. This first bandwidth group and priority level is also referred to as the current priority level and bandwidth group from which connections are selected for release. At 240, the connection selected is added to the list of potentially released connections.

At determination step 250, the present embodiment determines if a threshold level of the total number of connections in the list of potentially released connections has reached a threshold. That is, the threshold indicates an upper bound on the number of connections that can be released per incoming higher priority connection to prevent network instability. In the present embodiment, once the threshold is reached, the process is terminated at 260 without releasing any connections from the list. That is, the incoming connection is not established to avoid potential instability in the network. On the other hand, if the threshold level has not been reached, then the present embodiment proceeds to 265.

At 265, the present embodiment determines if there is sufficient bandwidth in the list of potentially released connections to add up to the required bandwidth. If there is sufficient bandwidth collected, then the present embodiment continues to 270 and releases the connections in order to accommodate the incoming connection.

On the other hand, if there is insufficient bandwidth to add up to the required bandwidth needed to support the incoming connection, then the present embodiment proceeds to 275 and determines if there are any connections remaining the current priority level and bandwidth group. If there are connections remaining, then the present embodiment proceeds back to 230 to select another connection. That is, the present embodiment selects connections to be released from the current priority level and bandwidth group in the sort list until reaching the required bandwidth in an iterative process or until all the connections at the current priority level and bandwidth group have been exhausted.

However, if there are no connections at 275, then the present embodiment proceeds to 280 to determine if there are any connections remaining in the sort list. If there are no more connections, then there is insufficient bandwidth that can be released and the process ends.

On the other hand, if there are existing connections remaining in the sort list, at 285, the present embodiment performs resorts the sort list. The sort list is resorted again by descending order of bandwidth group. Also, if there are no other bandwidth groups in the current priority level, then that priority level drops out of the sort list upon resorting.

In one embodiment, the sort list is resorted using an insertion sort. That is, if there is a next highest bandwidth group in the current priority level, that is inserted into the sort list for that priority level, and the sort list is resorted again by descending order of bandwidth group. The next highest bandwidth group is accessed by the chain of active bandwidth groups in the current priority level, as described below in FIG. 6. Also, if there are no other bandwidth groups in the current priority level, then that priority level drops out of the sort list upon resorting. The insertion sort is computationally inexpensive when updating the sort list as most of the sort list has already been created.

For instance, in the example of FIG. 3 and Table 1, if all the connections (two) in the first bandwidth group BW40, PL10 have been added to the list of potentially released connections and there is still not enough bandwidth to meet the required bandwidth, then the sort list of Table 1 is resorted. Table 2 illustrates the resorted sort list.

TABLE 2

Resorted Sort List of FIG. 3

| Bandwidth Group | Priority Level | Connections |
| --- | --- | --- |
| BW38 | PL10 | 3 |
| BW35 | PL15 | 1 |
| BW35 | PL11 | 3 |
| BW20 | PL8 | 2 |

After the resort is performed in 285, the present embodiment iteratively returns to 230 and again selects a connection to be released from the highest bandwidth group in the sort list.

The process illustrated in FIGS. 2A and 2B is performed iteratively until sufficient connections are selected to be released to satisfy the required bandwidth necessary to accommodate the incoming connection. Otherwise the process terminates if either a threshold has been reached or if there are insufficient connections to be released.

Figure 4:
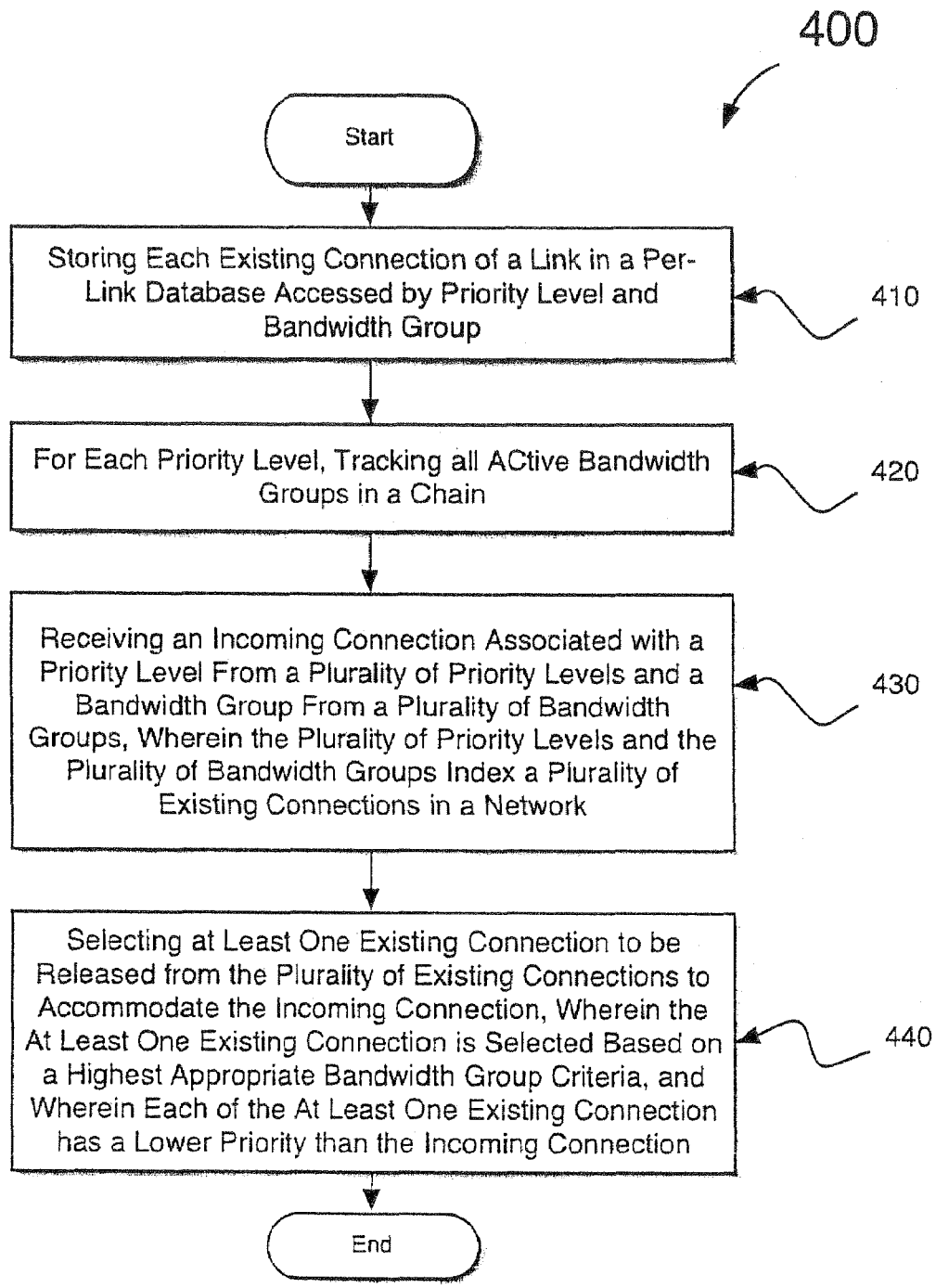
FIG. 4 is a flow diagram illustrating a computer implemented method for selecting connections to bump based on priority in a network, in accordance with one embodiment of the present invention.

FIG. 4 is a flow diagram 400 illustrating steps in a computer implemented method for selecting connections to bump based on priority in a network, in accordance with one embodiment of the present invention. The method is implemented over a network including connections ranked by priority. For instance, the method is implemented to determine and select connections over a link in an ATM network to accommodate an incoming connection, in one embodiment.

At 410, the present embodiment stores each existing connection associated with a link in an ATM network in a per-link database. The per-link database is indexed by priority level and bandwidth group. Connections are ranked in priority by a priority level system. For instance, in one embodiment, 15 levels of priority rank connections where lower numbers of priority levels have higher priority than lower numbers of priority level.

Figure 6:
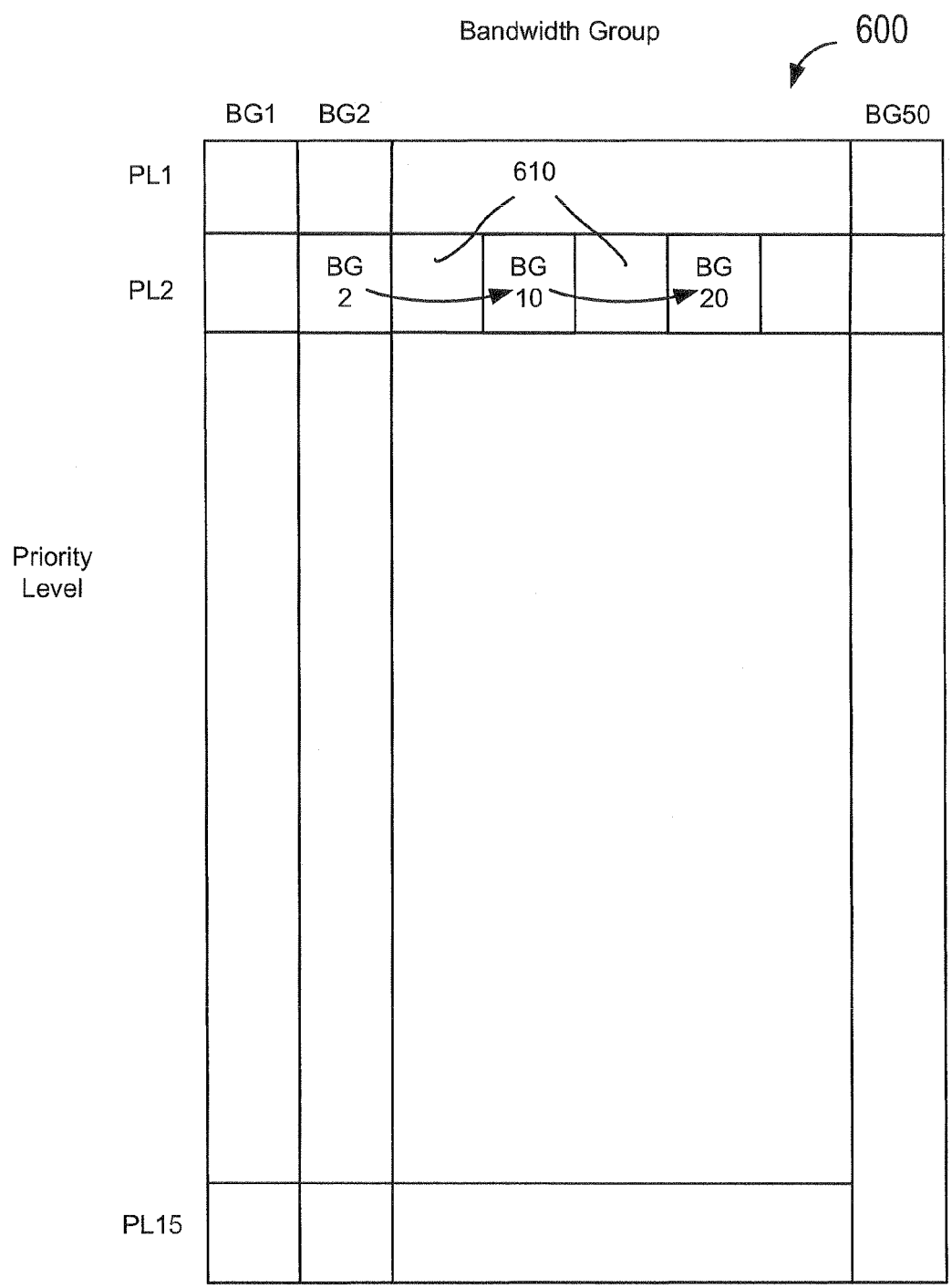
FIG. 6 is a diagram of a per-link database illustrating a chain linking active bandwidth groups at a priority level, in accordance with one embodiment of the present invention.

FIG. 6 is an exemplary diagram of a per-link database 600. As shown in FIG. 6, as an example, 15 levels of priority are shown, where connections of priority level 1 have a higher priority than connections at a lower priority level (e.g., priority level 10). Embodiments of the present invention can be implemented with any number of priority levels, greater or fewer than 15. Also, embodiments of the present invention can be implemented using any priority level scheme.

The bandwidth group is based on the actual bandwidth resources used by a connection. The bandwidth is grouped into configurable buckets. For instance, in FIG. 6, fifty bandwidth groups are shown for illustration purposes only. Connections of bandwidth group 1 (BG1) have bandwidths between 0 to 1,000 cells per second (cps). Also, connections of bandwidth group 2 (BG2) have bandwidths between 1,001 cps to 2,000 cps. Each increasing bandwidth group represents connections requiring higher bandwidth. As shown in FIG. 6, bandwidth group 50 (BG50) has connections of bandwidths between 49,001 cps and higher.

While embodiments of the present invention are disclosed with a per-link database having fifty bandwidth groups, wherein each bandwidth group has a bandwidth of approximately 1,000 cps more than an immediately preceding bandwidth group, other embodiments are well suited to per-link databases having a greater or fewer amount of bandwidth groups. In addition, other embodiments are well suited to bandwidth groups having varying amounts of bandwidth.

Returning to FIG. 4, at 420, the present embodiment tracks all active bandwidth groups in a chain for each priority level. An active bandwidth group contains one or more connections. A chain relates all the active bandwidth groups at a certain priority level. For instance, in FIG. 6, a chain 610 relates the active bandwidth groups BG2, BG10, and BG20 at priority level 2 (PL2).

In one embodiment, the first active bandwidth group in the chain 610 will be the lowest active bandwidth group, and the last active bandwidth group in the chain 610 is the highest bandwidth group of that priority level. For instance in chain 610, the order of active bandwidth groups from first to last is as follows: BG2, BG10, and lastly BG20.

The operations of 410 and 420 are performed independently of the process to select existing connections to be released to accommodate the incoming connection in 430 and 440.

At 430, the present embodiment continues by receiving an incoming connection associated with a priority level and a bandwidth group. The priority level is taken from a plurality of priority levels and the bandwidth group is taken from a plurality of bandwidth groups. The plurality of priority levels and the plurality of bandwidth groups index a plurality of existing connections, for example over a link in the network.

At 440, the present embodiment then selects at least one existing connection to be released from the plurality of existing connections to accommodate the incoming connection. Each of the at least one existing connection has a lower priority than the incoming connection. In the present embodiment, the at least one existing connections selected based on a highest appropriate bandwidth group criteria, as previously described in FIGS. 2A and 2B. In this manner, the least amount of connections are selected to be released to accommodate the incoming connection over the link in the network.

Figure 5:
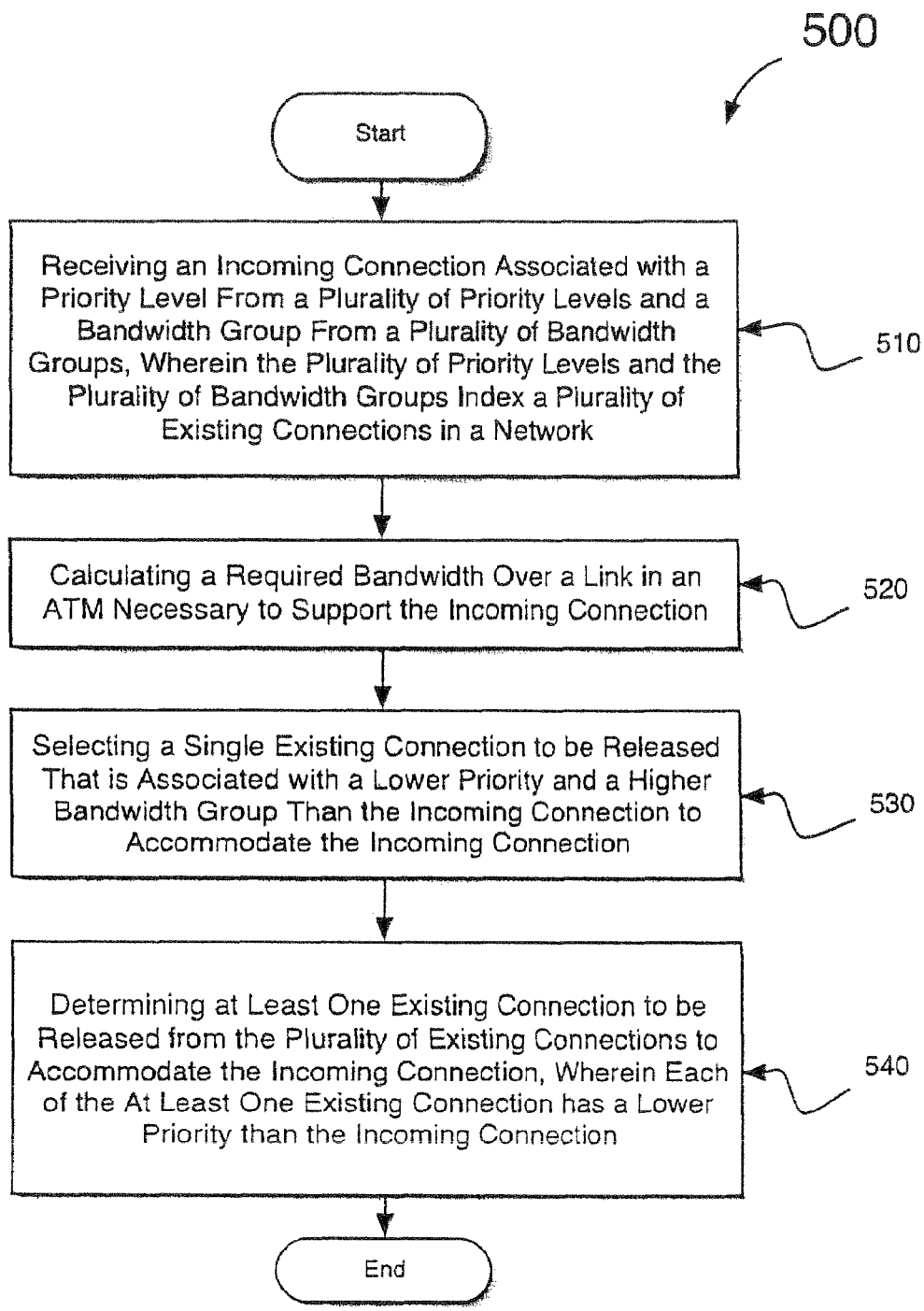
FIG. 5 is a flow diagram illustrating a computer implemented method for selecting connections to bump based on priority in a network, in accordance with one embodiment of the present invention.

FIG. 5 is a flow diagram 500 illustrating steps in a computer implemented method for selecting connections to bump based on priority in a network, in accordance with one embodiment of the present invention. The method is implemented over a network including connections of varying bandwidths and ranked by priority. In addition, the connections are grouped by bandwidth group of varying increments of bandwidth. For instance, the method is implemented to determine and select connections over a link in an network (e.g., ATM network) to accommodate an incoming connection, in one embodiment.

At 510, the present embodiment begins by receiving an incoming connection associated with a priority level from a plurality of priority levels and a bandwidth group from a plurality of bandwidth groups. The plurality of priority levels and the plurality of bandwidth groups index a plurality of existing connections, for example over a link in the network.

At 520, the present embodiment calculates a required bandwidth necessary to support the incoming connection. Equation 1 illustrates how to calculate the required bandwidth (BW) to release over the link to accommodate the incoming connection.

$$\text{Required } BW = \text{Connection } BW - \text{Available } BW \quad (1)$$

For instance, for illustration only, an incoming connection has a connection BW of 30,000 cps. A link is bandwidth constrained 50,000 cps, but has existing connections occupying 40,000 cps. As such, the available bandwidth over the link is 10,000 cps. Using Equation 1, the required bandwidth is 20,000 cps. In this case, connections adding up to 20,000 cps need to be released to accommodate the incoming connection.

In one embodiment, this calculation is only performed if the available bandwidth is less than the connection bandwidth. In this case, the available bandwidth is unable to support the incoming connection.

At 530, the present embodiment continues by selecting a single existing connection to be released that is associated with a lower priority and a higher bandwidth group than the incoming connection, as will described in full below. The single existing connection has a connection bandwidth that is greater than the required bandwidth needed for the incoming connection. If the single existing connection can be selected, then the present embodiment is able to accommodate the incoming connection.

At 540, if the single existing connection is not selected, then the present embodiment selects at least one existing connection to be released from the plurality of existing connections. Each of the at least one existing connection has a lower priority level and at least the same bandwidth group than that of the incoming connection. The process for selecting the connections to satisfy the required bandwidth to accommodate the incoming connection was previously described in FIGS. 2A and 2B.

The present embodiment as described in FIG. 5 provides for an efficient way to select existing connections over a link in a network to accommodate an incoming connection with higher priority. That is, the method of FIG. 5 ensures that the least amount of connections to be released are selected. For instance, a single existing connection with lower priority and higher bandwidth than the incoming connection is quickly selected from the per-link database if possible, otherwise at least one existing connection is selected from existing connections with lower priority and the same or lower bandwidth as the incoming connection.

Accordingly, various embodiments of the present invention disclose a method and system for selecting connections to bump based on priority in a network. Embodiments of the present invention provide for selecting the least number of connections to be released to accommodate an incoming connection. In addition, embodiments of the present invention provide for efficient use of computing resources in order to determine the connections to be released to free up bandwidth. Also, embodiments of the present invention are scalable to larger numbers of connections.

While the methods of embodiments illustrated in flow diagrams 200A, 200B, 400, and 500 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for selecting connections to bump based on priority in a network are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method of selecting connections to bump based on priority in a network, comprising:
   receiving an incoming connection associated with a priority level from a plurality of priority levels and a bandwidth group from a plurality of bandwidth groups, wherein said plurality of priority levels and said plurality of bandwidth groups index a plurality of existing connections;
   calculating a required bandwidth necessary to support said incoming connection;
   selecting a single existing connection to be released that is associated with a lower priority and a higher bandwidth group than said incoming connection to accommodate said incoming connection; and
   selecting at least one existing connection to be released from said plurality of existing connections having a lower priority level and at least the same bandwidth group than that of said incoming connection if said single existing connection is not selected to accommodate said incoming connection.

2. The method of claim 1, wherein said selecting a single existing connection further comprises:
   selecting an existing connection to be released that has the lowest priority in a group of existing connections each of which is associated with a lower priority and a higher bandwidth group than said incoming connection.

3. The method of claim 1, wherein said selecting at least one existing connection further comprises:
   sorting said plurality of existing connections into a sort list by descending order of highest bandwidth group per each priority level in said plurality of priority levels that is lower than said priority level of said incoming connection; and
   selecting connections to be released from the highest bandwidth group of a current priority in said sort list until releasing a required bandwidth to support said incoming connection.

4. The method of claim 3, further comprising:
   resorting said sort list after exhausting connections from said current priority if there is insufficient bandwidth released; and
   iteratively returning to said selecting connections to be released from the highest bandwidth group and resorting said sort list until releasing said required bandwidth.

5. The method of claim 3, wherein said sorting said plurality of existing connections further comprises:
   sorting by lowest priority level between two or more priority levels having the same highest bandwidth group.

6. The method of claim 1, further comprising:
   terminating said incoming connection if a total number of connections in said at least one existing connection reaches a threshold.

7. The method of claim 1 wherein said plurality of connections is associated with a link from a bandwidth constrained line of a switch.

8. The method of claim 1, wherein said network is an ATM network.

9. A method of selecting connections to bump based on priority in an ATM network, comprising:
   receiving an incoming connection associated with a priority level from a plurality of priority levels and a bandwidth group from a plurality of bandwidth groups, wherein said plurality of priority levels and said plurality of bandwidth groups index a plurality of existing connections; and
   selecting at least one existing connection to be released from said plurality of existing connections to accommodate said incoming connection, wherein said at least one existing connection is selected based on a highest appropriate bandwidth group criteria, and wherein each of said at least one existing connection has a lower priority than said incoming connection.

10. The method of claim 9, wherein said selecting at least one existing connection further comprises:
    calculating a required bandwidth necessary to support said incoming connection over a link in said network.

11. The method of claim 9, wherein said selecting at least one existing connection further comprises:
selecting an existing connection to be released that is associated with a lower priority and a higher bandwidth group than said incoming connection.

12. The method of claim 9, wherein said selecting at least one existing connection further comprises:
sorting said plurality of existing connections into a sort list by descending order of highest bandwidth group per each priority level in said plurality of priority levels that is lower than said priority level of said incoming connection; and
selecting connections to be released from the highest bandwidth group of a current priority in said sort list until releasing a required bandwidth to support said incoming connection.

13. The method of claim 12, wherein said selecting at least one existing connection further comprises:
resorting said sort list after exhausting connections from said current priority if there is insufficient bandwidth released; and
iteratively returning to said selecting connections from the highest bandwidth group until releasing said required bandwidth.

14. The method of claim 9, wherein said at least one existing connection to be released from said plurality of existing connections comprises two or more existing connections.

15. The method of claim 14 wherein a bandwidth of each of said two or more existing connections is the same or less than a bandwidth of said incoming connection.

16. A computer system, comprising:
a processor;
a bus coupled to said processor; and
a computer readable medium coupled to said bus and having instructions stored thereon, wherein when the instructions are executed by said processor, they are operable to implement a method of selecting connections to bump based on priority in a network, comprising:
receiving an incoming connection associated with a priority level from a plurality of priority levels and a bandwidth group from a plurality of bandwidth groups, wherein said plurality of priority levels and said plurality of bandwidth groups index a plurality of existing connections;
calculating a required bandwidth necessary to support said incoming connection;
selecting a single existing connection to be released that is associated with a lower priority and a higher bandwidth group than said incoming connection to accommodate said incoming connection; and
selecting at least one existing connection to be released from said plurality of existing connections having a lower priority level and at least the same bandwidth group than that of said incoming connection if said single existing connection is not selected to accommodate said incoming connection.

17. The computer system of claim 16, wherein said instructions are further operable to implement a method comprising:
selecting an existing connection to be released that has the lowest priority in a group of existing connections each of which is associated with a lower priority and a higher bandwidth group than said incoming connection.

18. The computer system of claim 16, wherein said instructions are further operable to implement a method comprising:
sorting said plurality of existing connections into a sort list by descending order of highest bandwidth group per each priority level in said plurality of priority levels that is lower than said priority level of said incoming connection; and
selecting connections to be released from the highest bandwidth group of a current priority in said sort list until releasing a required bandwidth to support said incoming connection.

19. The computer system of claim 18, wherein said instructions are further operable to implement a method comprising:
resorting said sort list after exhausting connections from said current priority if there is insufficient bandwidth released; and
iteratively returning to said selecting connections to be released from the highest bandwidth group and resorting said sort list until releasing said required bandwidth.

20. The computer system of claim 18, wherein said instructions are further operable to implement a method comprising:
sorting by lowest priority level between two or more priority levels having the same highest bandwidth group.

21. The computer system of claim 16, wherein said instructions are further operable to implement a method comprising:
terminating said incoming connection if a total number of connections in said at least one existing connection reaches a threshold.

22. The computer system of claim 16, wherein said plurality of connections are associated with a link from a bandwidth constrained line of a switch.

23. The computer system of claim 16, wherein said network is an ATM network.

24. A computer readable medium containing executable instructions stored thereon which, when executed in a processing system, causes the system to perform a method of selecting connections to bump based on priority in a network, comprising:
receiving an incoming connection associated with a priority level from a plurality of priority levels and a bandwidth associated with a bandwidth group from a plurality of bandwidth groups, wherein said plurality of priority levels and said plurality of bandwidth groups index a plurality of existing connections;
calculating a required bandwidth necessary to support said incoming connection;
selecting a single existing connection to be released that is associated with a lower priority and a higher bandwidth group than said incoming connection to accommodate said incoming connection; and
selecting at least one existing connection to be released from said plurality of existing connections having a lower priority level and the same or lower bandwidth group than that of said incoming connection if there is no single existing connection that is associated with a lower priority and a higher bandwidth group than said incoming connection.

25. The computer readable medium of claim 24, wherein said selecting a single existing connection in said method further comprises:
selecting an existing connection to be released that has the lowest priority in a group of existing connections each of which is associated with a lower priority and a higher bandwidth group than said incoming connection.

26. The computer readable medium of claim 24, wherein said selecting at least one existing connection in said method further comprises:
sorting said plurality of existing connections into a sort list by descending order of highest bandwidth group per each priority level in said plurality of priority levels that is lower than said priority level of said incoming connection; and selecting connections to be released from the highest bandwidth group of a current priority in said sort list until releasing a required bandwidth to support said incoming connection.

27. The computer readable medium of claim 26, wherein said method further comprises:

resorting said sort list after exhausting connections from said current priority if there is insufficient bandwidth released; and iteratively returning to said selecting connections to be released from the highest bandwidth group and resorting said sort list until releasing said required bandwidth.

28. The computer readable medium of claim 24, wherein said method further comprises:

terminating said incoming connection if a total number of connections in said at least one existing connection reaches a threshold.

29. A system comprised of one or more switches, wherein said one or more switches are capable of:

receiving an incoming connection associated with a priority level from a plurality of priority levels and a bandwidth group from a plurality of bandwidth groups, wherein said plurality of priority levels and said plurality of bandwidth groups index a plurality of existing connections;

calculating a required bandwidth necessary to support said incoming connection;

selecting a single existing connection to be released that is associated with a lower priority and a higher bandwidth group than said incoming connection to accommodate said incoming connection; and determining at least one existing connection to be released from said plurality of existing connections having a lower priority level and the same or lower bandwidth group than that of said incoming connection if there is no single existing connection that is associated with a lower priority and a higher bandwidth group than said incoming connection.

30. The system of claim 29, wherein said one or more switches are further capable of:

selecting an existing connection to be released that has the lowest priority in a group of existing connections each of which is associated with a lower priority and a higher bandwidth group than said incoming connection.

31. The system of claim 29, wherein said one or more switches are further capable of:

sorting said plurality of existing connections into a sort list by descending order of highest bandwidth group per each priority level in said plurality of priority levels that is lower than said priority level of said incoming connection; and selecting connections to be released from the highest bandwidth group of a current priority in said sort list until releasing a required bandwidth to support said incoming connection.

32. The system of claim 31, wherein said one or more switches are further capable of:

resorting said sort list after exhausting connections from said current priority if there is insufficient bandwidth released; and iteratively returning to said selecting connections to be released from the highest bandwidth group and resorting said sort list until releasing said required bandwidth.

33. The system of claim 29, wherein said one or more switches are further capable of:

terminating said incoming connection if a total number of connections in said at least one existing connection reaches a threshold.

* * * * *